United States Patent [19]
Yamada et al.

[11] Patent Number: 6,083,539
[45] Date of Patent: Jul. 4, 2000

[54] BUCKWHEAT STARCH SYRUP, METHOD FOR PREPARING THE SAME, AND FOODS CONTAINING THE SAME

[75] Inventors: Takao Yamada; Yoshio Iljima, both of Tokyo, Japan

[73] Assignee: Sakuma Ebisu Kabushiki Kaisha, Tokyo, Japan

[21] Appl. No.: 09/040,873

[22] Filed: Mar. 18, 1998

Related U.S. Application Data

[63] Continuation-in-part of application No. 08/902,711, Jul. 30, 1997, abandoned, which is a continuation-in-part of application No. 08/495,120, Jun. 27, 1995, abandoned.

[30] Foreign Application Priority Data

Dec. 16, 1994 [JP] Japan .................................. 6-313781
Dec. 16, 1994 [JP] Japan .................................. 6-313782
Feb. 28, 1995 [JP] Japan .................................. 7-039777
Feb. 28, 1995 [JP] Japan .................................. 7-039778

[51] Int. Cl.[7] .............................. A23L 1/09; A23L 1/10; A23L 1/105
[52] U.S. Cl. ............................. 426/28; 426/18; 426/658; 435/15; 435/20
[58] Field of Search ................................ 426/18, 658, 28; 435/15, 20

[56] References Cited

U.S. PATENT DOCUMENTS 4,282,319  8/1981  Conrad ...................................... 426/18
4,656,040  4/1987  Fulger et al. .
4,710,386  12/1987  Fulger et al. .

OTHER PUBLICATIONS

Ogur–N, 85–307710 [49] WPIDS, Abstract JP 60214856A.
Winton et al., "The Structure and Composition of Foods," vol. 1, Cereals, Starch, Oil Seeds, Nuts, Oils, Forage Plants, 1932, John Wiley & Sons, Inc., New York, pp. 302–313.

Database WPI on Epoque, week 8151, London: Derwent Publications Ltd., AN 81–94014, Class D01B, JP 56–144062A (KOHZU), abstract.

Database WPI on Epoque, week 8341, London: Derwent Publications Ltd., AN 83–786691, Class D05B, JP 58–149684 A (YG S Y Associate), abstract.

Database WPI on Epoque, week 8701, London: Derwent Publications Ltd., AN 87–002424, Class D05E, JP 61–260872 A (NISI NIPPONJOKAS), abstract.

Schormüller, J. Handbuch der Lebensmittelchemie, Berlin, Heidelberg, New York: Springer Verlag, 1967, vol. 5, Part 1, pp. 637–647, 658.

Park, Won Ki *Dictionary of Korean Foods.* Shin–Kwang Publishing Co., Ltd., Korea: Apr. 20, 1991, p. 144.

Yang, Han Chul, *Food Industries.* Saemunsa Publishing Co., Ltd., Korea: Jan. 5, 1993, p. 143.

Song, Jae Chul, *Chemistry of Food Additives.* Saemunsa Publishing Co., Ltd., Korea: Jan. 5, 1995, pp. 216–219.

Excerpt from Japanese Biochemical Dictionary. pp. 71, 391–392.

*Primary Examiner*—Helen Pratt
*Attorney, Agent, or Firm*—Loeb & Loeb LLP

[57] ABSTRACT

The present invention relates to a buckwheat starch syrup prepared by liquefying, saccharisfying, and proteolyzing starch from buckwheat flour, a method for preparing the buckwheat starch syrup, and various foods containing the same. The buckwheat starch syrup of the present invention contains various amino acids and minerals, as well as rutin which is effective in preventing arteriosclerosis, and hence it is healthy and excellent in nutritive balance. Thus, the buckwheat starch syrup of the present invention can be suitably used in various foods.

20 Claims, 2 Drawing Sheets

HPCL CHROMATOGRAPHY

BUCKWHEAT STARCH SYRUP, METHOD FOR PREPARING THE SAME, AND FOODS CONTAINING THE SAME

This is a continuation-in-part, of application Ser. No. 08/902,711, filed Jul. 30, 1997, which is a continuation of Ser. No. 08/495,120 filed Jun. 27, 1995, both abandoned.

BACKGROUND OF THE INVENTION

1. Field of the Invention

The present invention relates to a buckwheat starch syrup prepared by liquefying and saccharifying starch from buckwheat flour, a method for preparing the buckwheat starch syrup and foods containing the same.

2. Description of the Prior Art

As raw materials for preparing starch syrups, various kinds of starch have been used, including corn, potato, sweet potato, tapioca, wrinkle-seeded pea, wheat, arrowroot, sago palm, rice, etc. Starch syrups are viscous, sweet materials prepared by decomposing and saccharifying the starch of these raw materials with saccharifying enzymes. They are widely used in candy products, such as caramels, drops and jellies; Japanese-style confections, such as bean jams and sweet jellies of beans; and other foods, such as jams, syrups and foods boiled down in soy sauce.

Recently, with growing attention to health in society, maltoligosaccharides, branched oligosaccharides, sugar alcohols, etc., have attracted attention from the viewpoints of growing *Lactobacillus bifidus* in the intestines, lowering sweetness and the number of calories, preventing tooth decay, and so forth. In order to obtain a starch syrup which significantly contains these saccharides, various investigations have been made into the kinds and combinations of enzymes to be added at the time of saccharification. However, these investigations have intended only to improve the saccharide components in starch syrups. Among the starch syrups made from the above-mentioned raw materials, no syrup is known to contain any effective component having value added. In other words, they have no characteristics in those components other than saccharides. Furthermore, with respect to raw material starch, nothing has been reported except for the above-mentioned materials which have been conventionally used.

OBJECTS AND SUMMARY OF THE INVENTION

It is an object of the present invention to provide, using a novel raw material starch not reported so far, a starch syrup which is excellent in nutritive balance with respect to various amino acids and minerals, and thus good for health. It is another object of the present invention to provide various foods containing the above-mentioned starch syrup.

The present inventors have made an intensive study toward the solution of the above assignment, and given attention to a Japanese traditional food "soba", which is a buckwheat noodle. As a result, the inventors have found that a buckwheat starch syrup prepared by liquefying and saccharifying a raw starch material from buckwheat flour contains various amino acids and minerals, as well as rutin, which is contained in buckwheat flour and is effective in preventing arteriosclerosis. Thus, the buckwheat starch syrup is found to be very healthy in components and excellent in nutritive balance. The present invention has been developed in view of these findings.

The present invention relates to a buckwheat starch syrup prepared by liquefying and saccharifying a raw starch material from buckwheat flour, a method for preparing the buckwheat starch syrup and foods containing the same.

BRIEF DESCRIPTION OF DRAWINGS

The above-mentioned and other features of this invention and the manner of obtaining them will become more apparent, and will be best understood by reference to the following description, taken in conjunction with the accompanying drawings. These drawings depict only a typical embodiment of the invention and do not therefore limit its scope. They serve to add specificity and detail, in which.

DETAILED DESCRIPTION OF THE INVENTION

Described below are preferred embodiments of a method for preparing the buckwheat starch syrup of the present invention.

Generally, it is preferred that the raw material starch for a starch syrup contain as little protein as possible from the viewpoint of filtration and other treatment. Buckwheat flour is classified into surface layer flour, external layer flour, medium layer flour, inside layer flour, a whole layer flour containing the former three, according to the portion of buckwheat seeds ground into flour. In the milling of buckwheat seeds, operations of crushing and sieving are repeated. During this process, crushing proceeds from the center of the endosperm to the surface layer of seeds in this order. The flour obtained from the first crushing and sieving is "inside layer flour" (also called "kafun" or "uchiko"). The kinds of flour obtained successively from the subsequent similar operations are called "medium layer flour" (also called "first flour"), "external layer flour" (also called "second flour") and "surface layer flour" (also called "third flour").

In one embodiment of the present invention, "uchiko" is used as the starting material for preparing a buckwheat starch syrup of the present invention. Uchiko is a kind of flour obtained from the first crushing and sieving. It is composed mainly of "inside layer flour", but it may also partially contain "medium layer flour". "Uchiko" buckwheat flour has a low protein content of about 3%. Uchiko buckwheat flour is a starch-containing fraction obtained by the process of milling buckwheat seeds, and is a raw material starch that can be used in the present invention as a starting material. On the other hand, in general, whole layer buckwheat flour has a high protein content and is not suitable as a starting material for preparing the buckwheat starch syrup of the present invention.

In accordance with one embodiment of the present invention, first, 2–3 volumes of water are added to the raw material uchiko buckwheat flour, which is then mixed and swollen to thereby obtain a starch milk (B×25–30). This starch milk is filtered to remove foreign substances, etc. The pH of the filtrate is adjusted at 5.0–6.0, and then a liquefying enzyme is added thereto to liquefy the filtrate.

As to the liquefying enzyme to be used in this procedure, α-amylase is used. For example, Neospeedase manufactured by NAGASE BIOCHEMICALS, LTD., is suitably used.

For the liquefying, the liquefying enzyme is added in an amount of 0.1–1.0% by weight based on the solid content of the starch stock solution, and the resultant mixture is left at 88–90° C. for 1–2 hours.

At the completion of the liquefying, the starch sugar has a DE (dextrose equivalent) value of about 10–20.

In addition to the above-mentioned enzyme saccharification method, the liquefying of starch can also be performed by using an acid, such as oxalic acid.

Next, the pH of the resultant liquefied product is adjusted at 5.0–6.0, and a saccharifying enzyme is added thereto in an amount of 0.1–0.3% by weight based on the solid content of the starch stock solution. Then, the resultant mixture is left at 50–60° C. for 16–24 hours for saccharification.

At the completion of the saccharification, the starch sugar has a DE (dextrose equivalent) value of about 35–45.

As to the saccharifying enzyme to be used in this procedure, β-amylase, α-glucosidase, β-glucosidase, transglucosidase, etc., may be enumerated. In view of the sugar composition in the saccharified solution, β-amylase is suitably used. Further, in order to additionally produce oligosaccharides, particularly branched oligosaccharides represented by isomaltose and panose, which are growth factors of *Lactobacillus bifidus*, transglucosidase may be used jointly. As a concrete example of this joint use, β-Biozyme® L (manufactured by Amano Pharmaceuticals Co., Ltd.) as β-amylase and α-Trans glucosidase L (manufactured by Amano Pharmaceuticals Co., Ltd.) as transglucosidase may be cited.

In one embodiment of the present invention, at the completion of the saccharification, the pH of the saccharified solution is adjusted at 4.0–4.5 to precipitate proteins through agglutination. The protein and non-starch components are then removed by filtration.

The above protein fraction recovered as solid residue is excellent in digestion, containing nutrient proteins, various amino acids, vitamins and minerals. Therefore, the protein fraction can be used as a food extender to be added to bean jams, dough for bread and cakes, etc., in contrast to the corresponding protein fraction from the conventional process using corn starch which has been used only as feed for chickens.

In accordance with the another embodiment of the present invention, after completion of the saccharification, the pH of the saccharified solution is adjusted at 4.0–4.5, and a protease is added thereto at a rate of 0.1–0.3% by weight based on the solid content of the starch. Then, the resultant mixture is left at 50–60° C. for 6–8 hours to perform proteolysis. As to the protease to be used in this procedure, a protease derived from *Aspergillus oryzae* or *Aspergillus nigar* may be used. For example, Denazyme or Denapsin (both manufactured by NAGASE BIOCHEMICAL, LTD.) is suitably used. After completion of the above protease treatment, the solution temperature is raised to 90–95° C. for the inactivation of the enzyme.

Next, diatomaceous earth is added to the protease treated solution of 90–95° C. at a rate of 10–15% by weight based on the solid content of the starch. The resultant mixture is passed through a filter press while the mixture is at 70° C. or above. Finally, the filtrate is vacuum-concentrated (degree of vacuum: 200–500 mmHg) to obtain a desired starch syrup.

The buckwheat syrup of the present invention obtained according to the above procedure is very viscous and draws well. Compared to conventional enzyme-saccharified starch syrups (the so-called "high-maltose starch syrup") having a strong sweet taste like sugar, the buckwheat starch syrup of the present invention has a slight sweet taste and a fragrance. When used in combination with concentrated products (condensed products, extracts, etc.) such as milk, fruit, nuts, coffee, tea, or the like, the buckwheat starch syrup of the present invention has an effect of reinforcing the tastes of these products.

The buckwheat starch syrup thus obtained contains various oligosaccharides represented by maltose, maltotriose, maltotetraose and maltopentaose; particularly, when the saccharification is carried out with β-amylase and transglucosidase, the starch syrup contains various branched oligosaccharides represented by isomaltose, panose and isomaltotriose. In addition, the buckwheat starch syrup contains not only these saccharides but also various amino acids (such as glutamic acid, glycine, alanine, aspartic acid, lysine and arginine), minerals, vitamins, and the like, in good balance. The buckwheat starch syrup also contains rutin from buckwheat which is effective in improving the resistance of capillary vessels. Therefore, the buckwheat starch syrup of the present invention is effective in preventing adult diseases, such as arteriosclerosis and hypertension, and is also excellent in nutritive balance. Thus, the syrup is very useful as a healthy food.

The starch syrup according to the present invention can be suitably used in various foods, for example, candy products such as drops, caramels, nougats, taffies, marshmallows, brittles and jellies; confections such as chewing gums, chocolate products, biscuits, cookies, sweet jellies of beans and bean jams; ices such as ice creams and sherberts; fish meat products such as boiled fish paste; meat products such as sausages and hams; syrups such as jams, marmalade, fruit sauces, syruped fruit, and a syrup for crushed ice; pastes such as flour paste and fruit paste; pickles such as sliced vegetables pickled in soy sauce, thinly sliced pickled turnip and pickled scallions; and food boiled down in soy sauce.

The preparation of each of the above-mentioned foods may be carried out according to conventional methods except that a buckwheat starch syrup is used as a starch syrup. The preparation methods will be described later in Examples.

According to the present invention, there is provided a buckwheat starch syrup which contains various amino acids and minerals as well as rutin, which is effective in preventing arteriosclerosis, and is thus healthy and excellent in nutritive balance. In addition, there are also provided a method for preparing the buckwheat starch syrup and foods containing the same.

The present invention will be described in more detail with reference to Examples, which should not be construed to be limiting the scope of the present invention.

EXAMPLE 1

Preparation of Buckwheat Starch Syrup (1)

Two liters of water were added to 1 kg of raw material buckwheat flour ("uchiko"), which was then mixed and swollen to obtain a starch milk (B×33°). The pH of the starch milk was adjusted at 6.0, and 3 g of liquefying α-amylase (Neospeedase manufactured by NAGASE BIOCHEMICALS, LTD.) were added thereto. The resultant mixture was left at 90° C. for 2 hours for liquefying. At the completion of the liquefying, the starch sugar had a DE (dextrose equivalent) value of 20. Then, the pH of the resultant liquefied product was adjusted at 6.0, and 1 g of β-amylase (Spezyme® BBA manufactured by Finesugar group) was added thereto. The resultant mixture was left at 60° C. for 16 hours. At the completion of the saccharification, the starch sugar had a DE value of 43.

After the completion of the saccharification, the pH of the saccharified solution was adjusted at 4.0–4.5 with oxalic acid. Then, the solution was centrigued (at 3000 rpm for 15–20 minutes) to remove proteins and non-starch components. The supernatant was collected and treated with heat at 100° C. for 10 minutes.

Next, the supernatant was decolored with active carbon (granular carbon). Then, the supernatant was subjected to centrifugation or passed through a filter press to remove proteins as solid residue, and vacuum-concentrated to obtain a desired starch syrup.

EXAMPLE 2

Preparation of Buckwheat Starch Syrup (2)

A buckwheat starch syrup was prepared in the same manner as in Example 1 except that 0.15 g of β-Biozyme® L (manufactured by Amano Pharmaceuticals Co., Ltd.) as β-amylase and 0.75 g of α-Trans glucosidase L (manufactured by Amano Pharmaceuticals Co., Ltd.) as transglucosidase were used in combination.

EXAMPLE 3

Preparation of Buckwheat Starch Syrup (3)

A buckwheat starch syrup was prepared in the same manner as in Example 1 except that, after completion of the saccharification, the pH of the saccharified solution was adjusted to 4.0–4.5, and a protease was added thereto at a rate of 0.1–0.3% by weight based on the solid content of the starch. Then, the resultant mixture was left at 50–60° C. for 6–8 hours to perform proteolysis. Proteinase Denazyme or Denapsin (both manufactured by NAGASE BIOCHEMICAL, LTD.) was suitably used. After completion of the above protease treatment, the solution temperature was raised to 90–95° C. for the inactivation of the enzyme.

Next, diatomaceous earth was added to the protease treated solution at 90–95° C. at a rate of 10–15% by weight based on the solid content of the starch. The resultant mixture was passed through a filter press while the mixture is at 70° C. or above. Finally, the filtrate was vacuum-concentrated (degree of vacuum: 200–500 mmHg) to obtain a desired starch syrup.

TESTING EXAMPLE 1

Characteristic and Component Analysis of Buckwheat Starch Syrup

The buckwheat starch syrup obtained in Example 1 was analyzed on the following items:

(1) DE

43±1% (Lane-Eynon method)

(2) pH

5±1% (Glass electrode method with 30% solution)

(3) Viscosity 6000 cps (27° C.)

2250 cps (37.8° C.)

900 cps (49° C.)

(4) General component analysis and calorie

| | |
|---|---|
| Moisture content | 18.6% (Heat-drying under reduced pressure) |
| Proteins*[1] | 0.4% (Kjeldahl method) |
| Lipids | 0% (Soxhlet extraction) |
| Fiber | 0% (Improved Henneberg-Stohmann method) |
| Ash | 0.4% (Direct ashing) |

-continued

| | |
|---|---|
| Sugars[2] | 80.6% |
| Energy*[3] | 324 kcal/100 g |

*[1]Nitrogen/Protein conversion factor: 6.25
*[2]Calculation formula: 100 − (moisture content + proteins + lipids + fiber + ash)
*[3]Energy conversion factors:
proteins; 4
lipids; 9
carbohydrates (fiber + sugars); 4

(5) Sugar composition (Analytical conditions)

HPLC

Equipment used: Tosoh SC-8020 System (manufactured by Tosoh Corp.)

Column: Shodex SC-1011 (manufactured by Showa Denko K.K.)

8 φ×300 mm

Eluent: Distilled water

Temperature: 70° C.

Detection: Differential refractive index detector RI-8020 (manufactured by Tosoh Corp.)

| (Results) | |
|---|---|
| Glucose | 5.0% |
| Maltose | 38.0% |
| Maltotriose | 19.0% |
| Maltotetraose | 6.0% |
| G5 or more such as maltopentaose | 35.0% |

(6) Amino acid composition (Amino acid automatic analyzing method)

| | |
|---|---|
| Arginine | 14 mg/100 g |
| Lysine | 15 mg/100 g |
| Histidine | 7 mg/100 g |
| Phenylalanine | 7 mg/100 g |
| Tyrosine | 6 mg/100 g |
| Leucine | 10 mg/100 g |
| Isoleucine | 5 mg/100 g |
| Methionine | 3 mg/100 g |
| Valine | 8 mg/100 g |
| Alanine | 20 mg/100 g |
| Glycine | 37 mg/100 g |
| Proline | 12 mg/100 g |
| Glutamic acid | 56 mg/100 g |
| Serine | 13 mg/100 g |
| Threonine | 12 mg/100 g |
| Aspartic acid | 22 mg/100 g |

(7) Measurement of rutin content (Method and analytical conditions)

(i) Preparation of Test Solution

Five grams of test sample was accurately measured out and water was added thereto to give a 10 ml solution, which was used as a test solution.

(ii) HPLC Chromatography

A 20 μ1 standard solution of rutin (0.04–0.4 μg rutin/ml water) was applied to HPLC chromatography and its working curve was prepared. Next, 20 μ1 of the test solution was applied to HPLC chromatography and the rutin concentration in the test solution was determined based on the working curve. Then, the rutin concentration in the test sample was calculated. The detection limit was set at 0.01 mg/100 g.

Equipment used: Model 655A-12 (manufactured by HITACHI, LTD.)
Detector: Model 870-UV (manufactured by Jasco, Co.)
Column: YMC Pack ODS-A A-312
Mobile phase: 2.5% Acetic acid-Mehtahnol-Acetonitrile (35:5:10 V/V/V)
Wave length: 350 nm
Flow rate: 1 ml/min

| (Results) | |
|---|---|
| Rutin: | 0.065 mg/100 g |

Figure 1:
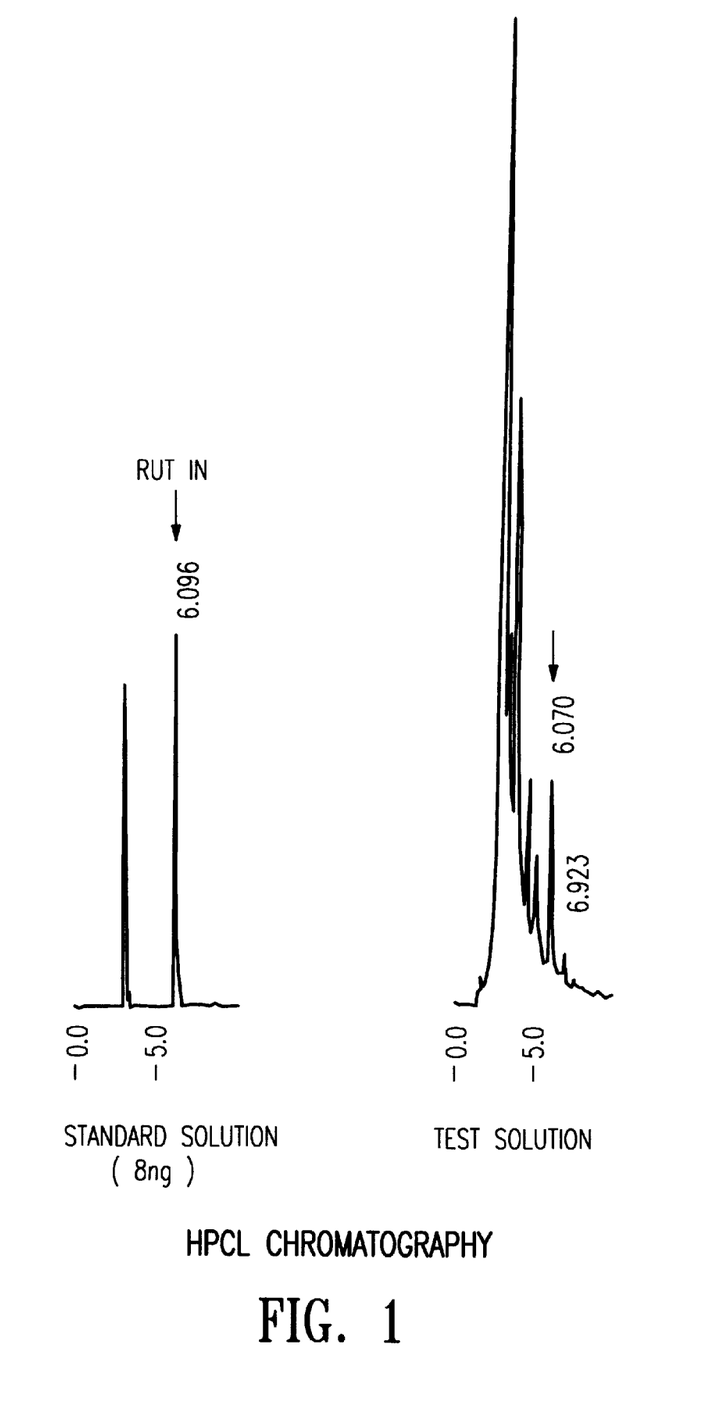
FIG. 1 is a chart showing the results of analysis of the buckwheat starch syrup of the present invention by HPLC chromatography.

The analysis results (chart) by HPLC chromatrograpy are shown in FIG. 1.

TESTING SAMPLE 2

Analysis of Sugar Composition in Buckwheat Starch Syrup

The sugar composition in the buckwheat starch syrup prepared in Example 2 was analyzed.

(Analytical Conditions)

The conditions were similar to those in Item (5) of Testing Example 1.

| (Results) | |
|---|---|
| Glucose | 15–20% |
| Maltose | 5–10% |
| Isomaltrose | 10–17% |
| Panose | 5–12% |
| Isomaltrotriose | 10–15% |

TESTING EXAMPLE 3

The time required for filtration is examined for two samples; one is a saccharified solution treated with a oryzae protease (Denazyme, NAGASE BIOCHEMICAL, LTD.) added at a rate of 0.2% by weight based on the solid content of the starch at 50° C. for 7 hours and the other is a saccharified solution without protease treatment. Specifically, these two samples were suction filtered with a Buchner funnel at 70–80° C. at 400–500 mmHg. The results are summarized in Table 1. Table 1 shows that the syrup treated with proteinase has a faster filtration time.

TABLE 1

| | Time required for filtration in producing 1.5 kg of buckwheat starch syrup |
|---|---|
| with protease treatment | 10–20 minutes |
| without protease treatment | 1–1.5 hours |

Figure 2:
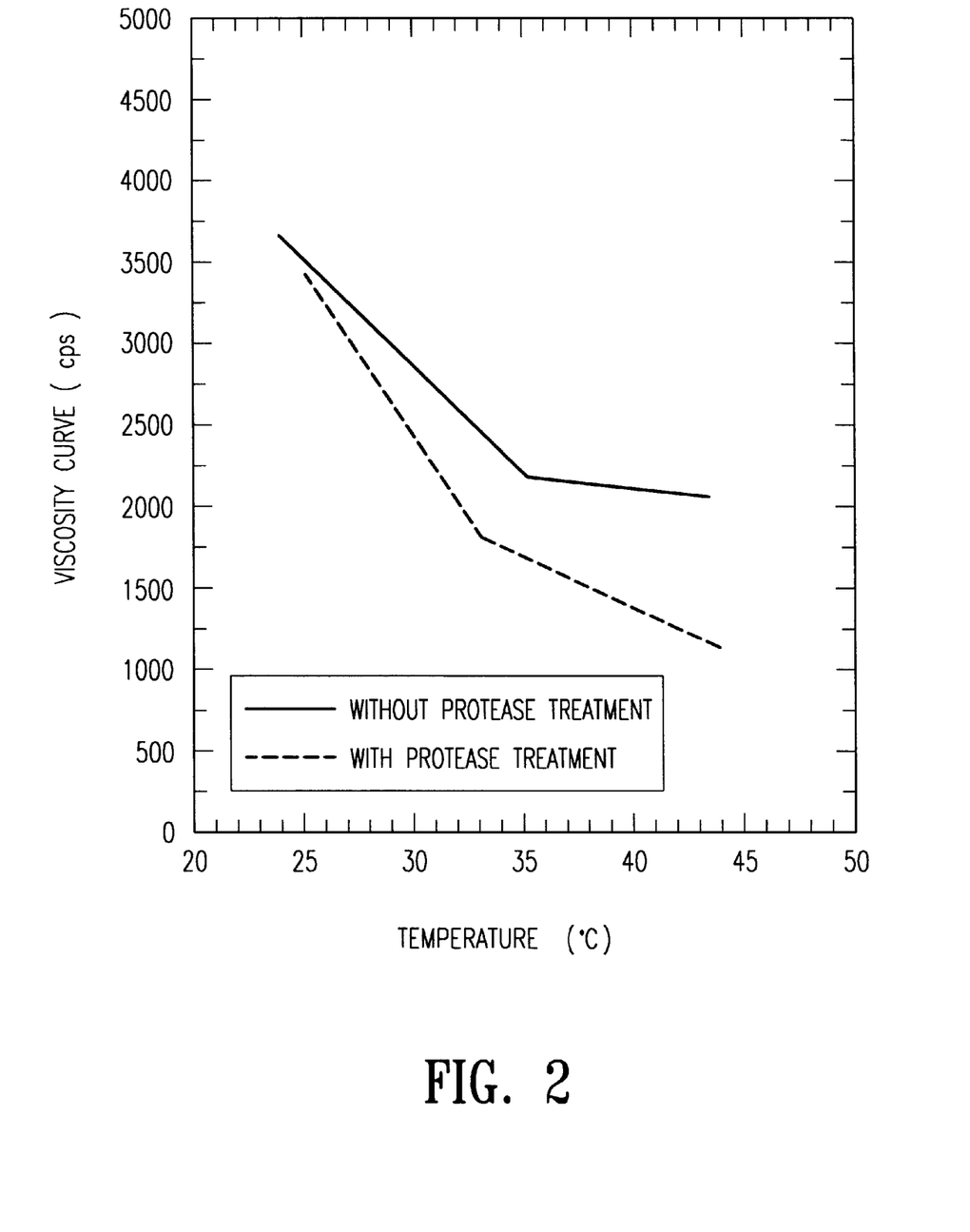
FIG. 2 is a chart showing a viscosity curve of samples with or without proteinease treatment.

In addition, the viscosity curve of each of the above samples is as shown in FIG. 2.

Hereinbelow, methods for preparing various foods containing the buckwheat starch syrup prepared above will be described.

EXAMPLE 3

Preparation of Hard Candies

| Type A | | |
|---|---|---|
| (Raw materials) | Sugar | 40–70 kg |
| | Buckwheat starch syrup (moisture content: 25%) | 80–40 kg |
| Type B | | |
| (Raw materials) | Sugar | 38–68 kg |
| | Buckwheat starch syrup (moisture content: 25%) | 77–37 kg |
| | Oils & fats | 5 kg |
| | Emulsifying agent (glycerol fatty acid ester) | 0.1 kg |
| Type C | | |
| (Raw materials) | Sugar | 35–65 kg |
| | Buckwheat starch syrup (moisture content: 25%) | 75–35 kg |
| | Condensed whole milk (or dry whole milk powder) | 5 kg |
| | Oils & fats | 5 kg |
| | Emulsifying agent (glycerol fatty acid ester) | 0.1 kg |

Water was added to each of the above-mentioned raw material groups containing the buckwheat starch syrup prepared in Example 1 or 2, and mixed. Then, each mixture was dissolved by heating, and boiled down in a vacuum pan (or a boiling pan) at 130–140° C. under 550–650 mmHg. Next, the mixture was cooled to 100–110° C., and souring agents, pigments, flavoring agents and fruit juices were added thereto according to demands. The thus obtained candy dough was taken out on a cooling board and cooled there to 60–70° C. Then, the dough was moulded and shaped into hard candies of types A to C.

EXAMPLE 4

Preparation of Soft Candies or Milk Caramels

| (Raw materials A) for soft candies | |
|---|---|
| Sugar | 43 kg |
| Buckwheat starch group (moisture content: 25%) | 70 kg |
| Oils & fats | 10 kg |
| Emulsifying agent (glycerol fatty acid ester) | 0.1 kg |
| Starch | 2.0 kg |
| Water | 10 kg |
| (Raw materials A') for caramels | |
| Sugar | 30 kg |
| Buckwheat starch syrup (moisture content: 25%) | 70 kg |
| Oils & fats | 10 kg |
| Emulsifying agent (glycerol fatty acid ester) | 0.1 kg |
| Condensed whole milk | 30 kg |
| Water | 10 kg |
| (Raw materials B) for soft candies | |
| Fondant cream | 10 kg |
| Souring agent (citric acid) | 0.1 kg |
| Natural pigment (anthocyanin) | 0.05 kg |
| Flavoring agent (strawberry flavor) | 0.5 kg |
| (Raw materials B') for caramels | |
| Fondant cream | 10 kg |
| Flavoring agent (vanilla flavor) | 0.1 kg |

Raw materials A or A' were mixed and dissolved upon heating. The emulsified stock solution was boiled down at 115° C. under 660 mmHg. Then, the solution was cooled to 70–80° C., to which raw materials B or B' were added and mixed homogeneously. Each of the resultant mixtures was cooled to 40–50° C., and shaped into soft candies or milk caramels.

EXAMPLE 5

Preparation of Chewing Candies

Chewing candies were prepared in the same manner as in the preparation process for soft candies in Example 4 except that 2 kg of 50% gelatin was added together with the fondant cream.

EXAMPLE 6

Preparation of Gummy Candies

| (Raw materials A) | |
|---|---|
| Sugar | 50 kg |
| Buckwheat starch syrup (moisture content: 25%) | 40 kg |
| Water | 15 kg |
| (Raw materials B) | |
| Gelatin | 8 kg |
| Water | 15 kg |
| (Raw materials C) | |
| Citric acid | 1.5 kg |
| Natural pigment (anthocyanin) | 0.05 kg |
| Flavoring agent (strawberry flavor) | 0.2 kg |

Raw materials A were mixed, dissolved by heating and boiled down. To the resultant solution (85° Bé, wherein Bé stands for Baume degreee), raw materials B and C, both of which had been separately dissolved upon heating, were added and mixed. The resultant mixture was poured into starch moulds and left at ambient temperature for shaping. Thus, gummy candies were prepared.

EXAMPLE 7

Preparation of Nougat

| (Raw materials A) | |
|---|---|
| Sugar | 47 kg |
| Buckwheat starch syrup (moisture content: 25%) | 23 kg |
| Table salt | 0.2 kg |
| Water | 15 kg |
| (Frappe) | |
| <Raw materials B-1> | |
| Sugar | 50 kg |
| Buckwheat starch syrup (moisture content: 25%) | 38 kg |
| Water | 14 kg |
| <Raw materials B-2> | |
| Foaming agent (albumin) | 3 kg |
| Water | 4 kg |
| (Fondant cream) | |
| Sugar | 47 kg |
| Buckwheat starch syrup (moisture content: 25%) | 23 kg |
| Water | 15 kg |

① Preparation of Frappe

Raw materials B-1 were mixed, dissolved by heating and boiled down to 116° C. The resultant solution was gradually added to raw materials B-2 and mixed, to thereby prepare a frappe having a specific gravity of about 0.5.

② Preparation of Fondant Cream

Sugar and buckwheat starch syrup were dissolved in water, boiled down to 117° C., and then mixed while cooling with ice, to thereby obtain fine sugar crystals.

③ Raw materials A were mixed, dissolved by heating, and boiled down under 600 mmHg. To the resultant solution, 20 kg of the frappe prepared in ① above was added and mixed. Then, 5 kg of the fondant cream prepared in ②, 3 kg of oils and fats, and 200 g of flavoring agent were added thereto and mixed homogeneously. The resultant mixture was cooled to 40–50° C. and shaped. Thus, nougat was prepared.

EXAMPLE 8

Preparation of a Solid Lemon Pop and Hard Tablets

| (Raw materials A) for solid lemon pop | |
|---|---|
| Glucose | 5 kg |
| Buckwheat starch syrup (powder) | 92 kg |
| Corn starch | 1 kg |
| Citric acid | 1 kg |
| Fruit juice powder | 1 kg |
| Flavoring agent (lemon pop flavor) | 0.1 kg |
| (Raw materials B) for hard tablets | |
| Powder sugar | 68 kg |
| Buckwheat starch syrup (moisture content: 25%) | 10 kg |
| Gelatinizing agent (gelatin) | 0.5 kg |
| Oils & fats | 1 kg |
| Emulsifying agent (glycerol fatty acid ester) | 0.5 kg |
| (Raw materials C) | |
| Lubricant (sugar ester) | 0.5 kg |
| Flavoring agent (lemon pop flavor) | 0.5 kg |

Raw materials A or B were mixed homogeneously, granulated, dried at 40–100° C. and passed through a sifter to obtain uniform size granules. Then, raw materials C were added thereto and mixed. The resultant mixture was pressed into tablets to thereby obtain a solid lemon pop or hard tablets.

EXAMPLE 9

Preparation of Marshmallows

| (Raw materials A) | |
|---|---|
| Sugar | 20 kg |
| Buckwheat starch syrup (moisture content: 25%) | 8 kg |
| Water | 5 kg |
| (Raw materials B) | |
| Gelatin | 1.5 kg |
| Water | 4 kg |

Raw materials A were mixed, dissolved by heating and boiled down to 110–115° C. This solution was gradually added to raw materials B, which had been mixed, dissolved and whipped with a mixer in advance, and mixed. The resultant mixture was poured into dry starch molds, dried at 50–55° C., to thereby obtain marshmallows.

EXAMPLE 10

Preparation of Portion Jellies

| (Raw materials A) | |
|---|---|
| Gelatinizing agent (thickening polysaccharide) | 0.5 kg |
| pH regulator | 0.3 kg |
| Citric acid | 0.3 kg |
| Buckwheat starch syrup (moisture content: 25%) | 30 kg |
| Natural sweetener | 0.05 kg |
| Water | 80 kg |
| (Raw materials B) | |
| Flavoring agent (strawberry flavor) | 0.2 kg |
| Natural pigment (anthocyanin) | 0.03 kg |

Raw materials A were mixed, dispersed, dissolved and concentrated at 85° C. up to Bx70–80° C. Raw materials B were added to the resultant solution, which were then poured into packages. The contents were sterilized at 85° C. for 20 minutes, cooled with ice, and then the water was strained out or the contents were dried to thereby prepare portion jellies.

EXAMPLE 11

Preparation of a Pectin Jelly

A pectin jelly was prepared in the same manner as the preparation process for gummy candies in Example 6 except that pectin, carragheenan or locust bean gum was used independently or in combination instead of gelatin.

EXAMPLE 12

Preparation of a Jam

| (Raw materials A) | |
|---|---|
| Fruit | 40 kg |
| Sugar | 30 kg |
| Buckwheat starch syrup (moisture content: 25%) | 15 kg |
| (Raw materials B) | |
| Pectin | 0.5 kg |
| Water | 15 kg |
| (Raw materials C) | |
| 20% sodium benzoate | 0.2 kg |
| 20% potassium sorbate | 0.2 kg |
| (Raw materials D) | |
| Citric acid | 0.7 kg |
| Flavoring agent (strawberry flavor) | 01. kg |
| Pigment (anthocyanin) | 0.02 kg |

Raw materials A were mixed and dissolved by heating. To the resultant solution, raw materials B, wherein pectin was dissolved in hot water of 60–80° C., were added thereto and mixed. The resultant mixture was cooled to 70° C., and raw materials D were added thereto and mixed. The mixture was filled in packages at 60° C. and sterilized by heating, to thereby prepare a jam.

EXAMPLE 13

Preparation of Ice Cream

| (Raw materials) | |
|---|---|
| Milk | 20 kg |
| Condensed whole milk | 17 kg |
| Whip cream | 16 kg |
| Butter | 7 kg |
| Dry skim milk powder | 3 kg |
| Buckwheat starch syrup (moisture content: 25%) | 10 kg |
| Sugar | 2 kg |
| Stabilizer (sodium alginate) | 0.3 kg |
| Emulsifying agent (lecithin) | 0.3 kg |
| Water | 25 kg |
| Flavoring agent (vanilla flavor) | 0.8 kg |

Raw materials were mixed and dissolved with a mixer or the like at 30–70° C., and then filtered. The filtrate was homogenized with a homogenizer at 50–70° C. The resultant ice cream dough was sterilized at 68° C. or above, cooled and then aged at 0–5° C.

Next, a flavoring agent was added to the dough, which was then frozen at −2 to −8° C., filled in packages and hardened at −18° C., to thereby prepare ice cream. On the other hand, if the dough after the addition of the flavoring agent was filled in packages at 0–5° C., an ice mix is obtainable; soft ice cream is obtainable if the dough after the addition of the flavoring agent is frozen at −2 to −8° C.

REFERENCE EXAMPLE

| Component Analysis of Buckwheat Flour "Uchiko" | | |
|---|---|---|
| Moisture content | 14.0% | (Drying method) |
| Sugars | 82.1% | (100 minus other components) |
| Ash | 0.3% | (Drying method) |
| Crude protein | 3.6% | (Kjeldahl method) |
| Degree of whiteness | 72 | (Atomic absorption spectrometry) |

The foregoing is meant to illustrate, but not to limit, the scope of the invention. Indeed, those of ordinary skill in the art can readily envision and produce further embodiments, based on the teachings herein, without undue experimentation.

The present invention may be embodied in other specific forms without departing from its essential characteristics. The described embodiment is to be considered in all respects only as illustrative and not as restrictive. The scope of the invention is, therefore, indicated by the appended claims rather than by the foregoing description. All changes which come within the meaning and range of the equivalence of the claims are to be embraced within their scope.

I claim:

1. A buckwheat starch syrup prepared by a process comprising the steps of:
   (a) providing a uchiko buckwheat flour consisting essentially of inside layer flour obtained by the first crushing and sieving in the buckwheat seed milling process wherein crushing and sieving are repeated to obtain flour from an internal layer, a medium layer, an external layer and a surface layer sequentially;
   (b) liquefying, and saccharifying the uchiko buckwheat flour to obtain saccharified solution; and (c) proteolyzing the saccharified solution.

2. The buckwheat starch syrup according to claim 1, wherein the saccharification is carried out with β-amylase and transglucosidase.

3. The buckwheat starch syrup according to claim 1, wherein the proteolyzing is carried out with a protein derived from *Aspergillus oryzae* or *Aspergillus nigar*.

4. The buckwheat starch syrup of claim 1 comprising a maltoligosaccharide.

5. The buckwheat starch syrup of claim 4, wherein said maltoligosaccharide is selected from a group consisting of maltose, maltotriose, maltotetraose and maltopentaose.

6. The buckwheat starch syrup of claim 1 comprising an amino acid.

7. The buckwheat starch syrup of claim 6, wherein said amino acid is selected from a group consisting of arginine, alanine, glycine, glutamic acid and aspartic acid.

8. The buckwheat starch syrup of claim 1 comprising a mineral.

9. The buckwheat starch syrup of claim 1 comprising a vitamin.

10. The buckwheat starch syrup of claim 1, wherein the uchiko buckwheat flour contains about 3% of proteins by weight.

11. A method for preparing a buckwheat starch syrup comprising the steps of:
 (a) providing a uchiko buckwheat flour consisting essentially of inside layer flour obtained by the first crushing and sieving in the buckwheat seed milling process wherein crushing and sieving are repeated to obtain flour from an internal layer, a medium layer, an external layer and a surface layer sequentially;
 (b) liquifying and saccharifying the uchiko buckwheat flour to obtain saccharified solution; and
 (c) proteolyzing the saccharified solution.

12. The method of claim 11, wherein the uchiko buckwheat flour contains about 3% of proteins by weight.

13. A food containing a buckwheat starch syrup which has been prepared by a process comprising the steps of:
 (a) providing a uchiko buckwheat flour consisting essentially of inside layer flour obtained by the first crushing and sieving in the buckwheat seed milling process wherein crushing and sieving are repeated to obtain flour from an internal layer, a medium layer, an external layer and a surface layer sequentially;
 (b) liquifying, and saccharifying the uchiko buckwheat flour to obtain saccharified solution; and
 (c) proteolyzing the saccharified solution.

14. The food according to claim 13, wherein the saccharification is carried out with β-amylase and transglucosidase.

15. The food according to claim 13, wherein the proteolyzing is carried out with a protein derived from *Aspergillus oryzae* or *Aspergillus nigar*.

16. The food according to claim 13 being a candy product.

17. The food according to claim 16, wherein the candy product is selected from the group consisting of hard candies, soft candies, caramels, chewing candies, gummy candies, nougats and marshmallows.

18. The food according to claim 13 being a jelly.

19. The food according to claim 13 being a jam.

20. The food according to claim 13 being an ice cream.

* * * * *

UNITED STATES PATENT AND TRADEMARK OFFICE
CERTIFICATE OF CORRECTION

PATENT NO : 6,083,539
DATED : July 4, 2000
INVENTOR(S): Takao Yamada; Yoshio Iijima It is certified that error appears in the above-identified patent and that said Letters Patent is hereby corrected as shown below:

Cover Page under Assignee, delete "Ebisu" and insert --Seika--.

Signed and Sealed this

Twelfth Day of December, 2000

Q. TODD DICKINSON

*Attest:*

*Attesting Officer*         *Director of Patents and Trademarks*

UNITED STATES PATENT AND TRADEMARK OFFICE
CERTIFICATE OF CORRECTION

PATENT NO : 6,083,539
DATED : July 4, 2000
INVENTOR(S): Takao Yamada; Yoshio Iljima It is certified that error appears in the above-identified patent and that said Letters Patent is hereby corrected as shown below:

On the title page, item[73] delete "Ebisu" and insert --Seika--.

Signed and Sealed this

Sixth Day of March, 2001

NICHOLAS P. GODICI

Attest:

Attesting Officer

Acting Director of the United States Patent and Trademark Office